United States Patent
Metzger et al.

(10) Patent No.: US 8,380,335 B2
(45) Date of Patent: Feb. 19, 2013

(54) LIMIT REPOSITORY LIMIT MODEL AND RELATED SYSTEM AND METHOD

(75) Inventors: Douglas P. Metzger, Phoenix, AZ (US); James R. Christian, Calabasas, CA (US)

(73) Assignee: Honeywell International Inc., Morristown, NJ (US)

( * ) Notice: Subject to any disclaimer, the term of this patent is extended or adjusted under 35 U.S.C. 154(b) by 287 days.

(21) Appl. No.: 12/755,195

(22) Filed: Apr. 6, 2010

(65) Prior Publication Data

US 2011/0245953 A1    Oct. 6, 2011

(51) Int. Cl.
 *G06F 19/00* (2011.01)
(52) U.S. Cl. .................................... 700/108; 700/103
(58) Field of Classification Search ................ 700/108, 700/103, 174, 82, 28, 96; 702/58, 69, 185; 707/999.004
See application file for complete search history.

(56) References Cited

U.S. PATENT DOCUMENTS

| | | | |
|---|---|---|---|
| 5,428,733 A | 6/1995 | Carr | |
| 5,905,201 A * | 5/1999 | Petri | 73/504.03 |
| 5,943,236 A | 8/1999 | Ohno et al. | |
| 6,292,715 B1 * | 9/2001 | Rongo | 700/249 |
| 2006/0259160 A1 * | 11/2006 | Hood et al. | 700/20 |
| 2008/0077844 A1 | 3/2008 | Kim et al. | |
| 2008/0082312 A1 * | 4/2008 | Dash et al. | 703/25 |
| 2009/0249205 A1 | 10/2009 | Yoshimura et al. | |

FOREIGN PATENT DOCUMENTS

JP    4347779 A    12/1992

OTHER PUBLICATIONS

"Operations Management Pro", OM Pro 310, Specification and Technical Data, Aug. 2008, 47 pages.
"Operations Management Suite Configuration Guide", Business FLEX 230, Oct. 2009, 466 pages, Honeywell, Phoenix, Arizona.
Notification of Transmittal of the International Search Report and the Written Opinion of the International Searching Authority, or the Declaration dated Oct. 4, 2011 in connectio with International Patent Application No. PCT/US2011/029527.

* cited by examiner

*Primary Examiner* — Kidest Bahta

(57) ABSTRACT

An apparatus includes at least one memory configured to store application information associated with multiple process control applications used to control an industrial process. The application information includes multiple boundaries associated with the process control applications. Each boundary is associated with at least one of multiple hierarchical levels. The apparatus also includes at least one processing device configured to alter the association of the boundaries with the hierarchical levels independent of the process control applications. The hierarchical levels associated with different levels of criticality regarding the industrial process. In addition, the apparatus includes at least one interface configured to receive data from and transmit data to the process control applications.

21 Claims, 4 Drawing Sheets

LIMIT REPOSITORY LIMIT MODEL AND RELATED SYSTEM AND METHOD

TECHNICAL FIELD

This disclosure relates generally to process monitoring and control systems and more specifically to a limit repository limit model and related system and method.

BACKGROUND

Processing facilities are often managed using process control systems. Example processing facilities include manufacturing plants, chemical plants, crude oil refineries, oil production facilities, and ore processing plants. Among other operations, process control systems typically manage the use of motors, valves, pumps, heating/cooling devices, and other industrial equipment in the processing facilities.

Process variables generally represent various aspects of a process being controlled. Process monitoring and control applications often assign limits to process variables for different reasons. As particular examples, these limits can be selected based on safety or environmental risks, maximizing equipment lifespans, advanced process control techniques, and optimizing production rates. These limits can also be selected for use with operating alarms and operating targets.

SUMMARY

This disclosure provides a limit repository limit model and related system and method.

In a first embodiment, an apparatus includes at least one memory configured to store application information associated with multiple process control applications used to control an industrial process. The application information includes multiple boundaries associated with the process control applications. Each boundary is associated with at least one of multiple hierarchical levels. The apparatus also includes at least one processing device configured to alter the association of the boundaries with the hierarchical levels independent of the process control applications. The hierarchical levels associated with different levels of criticality regarding the industrial process. In addition, the apparatus includes at least one interface configured to receive data from and transmit data to the process control applications.

In a second embodiment, a method includes receiving application information associated with multiple process control applications used to control an industrial process. The application information includes multiple boundaries associated with the process control applications. Each boundary associated with at least one of multiple hierarchical levels. The method also includes altering the association of the boundaries with the hierarchical levels independent of the process control applications. The hierarchical levels associated with different levels of criticality regarding the industrial process.

In a third embodiment, a computer readable medium embodying a computer program, the computer program comprising computer readable program code for receiving application information associated with multiple process control applications used to control an industrial process. The application information includes multiple boundaries associated with the process control applications. Each boundary associated with at least one of multiple hierarchical levels. The computer readable program code also alters the association of the boundaries with the hierarchical levels independent of the process control applications. The hierarchical levels are associated with different levels of criticality regarding the industrial process.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
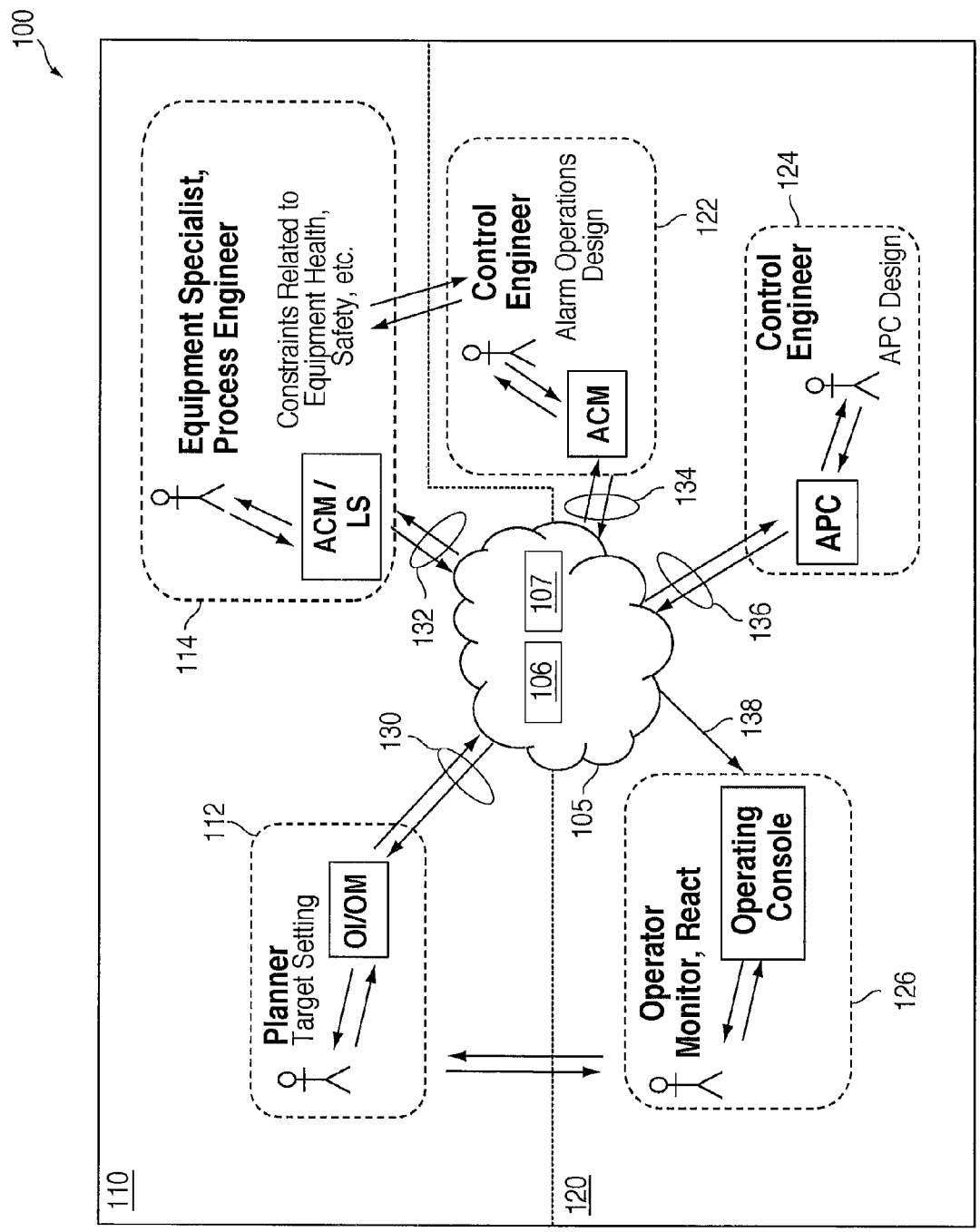
FIG. 1 illustrates an example system including operations involving a limit repository according to this disclosure.

FIG. 1 illustrates an example system 100 including operations involving a limit repository 105 according to this disclosure. The embodiment of the system 100 shown in FIG. 1 is for illustration only. Other systems could be used without departing from the scope of this disclosure.

As shown in FIG. 1, the system 100 includes the limit repository 105, a business network domain 110, and a control domain 120. In this example, the business network domain 110 includes one or more applications 112 for planners and one or more applications 114 for equipment specialists. The control domain 120 includes one or more applications 122 for control engineers/alarm configuration managers (ACMs), one or more applications 124 for advanced process control (APC) control engineers, and one or more application 126 for operators. The applications 112-114 and 122-126 could support any suitable functionality. As a particular example, the system 100 could be used with a refinery, and the applications 112-114 and 122-126 could be associated with activities within or related to the refinery. Note that the division of the applications between the domains 110 and 120 is for illustration only and that other divisions could be used, such as when at least some portion of the applications 122 are included within business network domain 110. Also note that any other or additional applications could be supported and that each application could be used by any number of users.

The planner's applications 112 can include an operations monitoring/operations instructions (IM/OI) application, which can be used to build specific weekly or daily plans (such as by setting operating targets) and to monitor the plans. The planner can set targets that are important for the plant to achieve for optimum production. The planner can also adjust the targets responsive to changes in the market, political or environmental concerns, or some other criteria. For example, if the price of gasoline is high during a particular week, the planner may increase the production targets for a refinery to produce more gasoline. However, the targets set by the planner should not drive the plant too close to or beyond certain limits set by the alarm rationalization team using the applications 122, discussed below.

The equipment specialist can identify equipment operating constraints, such as based on specific potential problems, using the applications 114. For example, the equipment specialist can identify the operating constraints based on various concerns, such as safety, environmental, equipment life (like machine health), and corrosion control concerns. These operating constraints can identify the problems against which distributed control system (DCS) alarms are built. The applications 114 can include a limit sets (LS) application that pulls together limits from the planner's applications 112 and from the equipment specialist's applications 114. The LS application can also assign limits to different layers of limits.

An alarm rationalization team can use the ACM applications 122 to design and manage various alarms based on the limits set by the equipment specialist. Control engineers or the alarm rationalization team can also use the ACM applications 122 to set alarm limit values that allow an operator time to react and avoid a problem without allowing so much time as to cause nuisance alarms. Therefore, the ACM applications 122 can configure an alarm to inform an operator to make corrections to the process before reaching a constraint.

The APC applications 124 can be included in an automatic control system that is controlling the process for the system 100, such as by controlling a reactor or cat-cracker. The APC 124 can control the process to operate within the targets set by the planner and within the equipment constraints set by the equipment specialist. For example, the APC applications 124 can control a cat-cracker in a fluid catalytic cracker process to maximize the output from the refinery while operating within alarm and equipment constraint limits. The APC applications 124 can specify control actions that operate equipment, such as moving valves. The APC applications 124 may also operate with additional limits.

The operator's applications 126 can be used to monitor processes and react to any alarms. The applications 126 can include operations management reporting and logging for keeping track of production results. The applications 126 can report any violations of equipment constraints, such as for safety, environmental, or corrosion control, that may have occurred.

In the example shown in FIG. 1, the system 100 includes multiple types of applications, each of which can be used to independently enter and control respective targets, constraints, or limits. Although these applications can relate to the same process measurements, the limits used by different applications can become inconsistent and can cause the applications to operate at cross-purposes. Inconsistent or conflicting applications can result in inefficient operation, costly plant incidents, and process shutdowns. Current approaches to solving this problem often involve strongly linking certain applications together such that they cannot be sold, installed, and/or maintained separately.

In accordance with this disclosure, the system 100 includes the limit repository 105, which is used to store and maintain a number of limits for a number of applications. The limit repository 105 supports a limit repository model (discussed below with respect to FIG. 2), which can be deployed over multiple limit repository instances and potentially in multiple network domains 110-120. Each of various limits used by the applications can have a single limit repository instance as its source, from which that limit can be copied to other limit repository instances. In this way, the limit repository 105 can help to ensure that limits are defined and used consistently across multiple applications.

The limit repository 105 bridges (is shared by) the business domain 110 and the control domain 120. The limit repository 105 can therefore be used to communicate or transport data between the business network domain 110 and the control domain 120. The multiple repository instances can be separated by a firewall to isolate failures in one domain from affecting the other domain. For example, if a virus occurs in the business network domain 110, the limit repository 105 can isolate the control domain 120 from the effects of the virus. The business domain 110 could even be shut down because of the virus without causing an associated shut down in the control domain 120.

Each limit repository instance within the limit repository 105 includes any suitable structure supporting the storage and maintenance of process control limits. For example, the limit repository 105 could include at least one processing device 106, such as a microprocessor, microcontroller, or central processing unit (CPU). The limit repository 105 could also include at least one memory 107 that includes or otherwise supports at least one database. The at least one memory 107 could include any suitable volatile and/or non-volatile storage and retrieval device or devices.

The limit repository 105 further includes a number of interfaces 130-138, such as defined release independent interfaces, that couple the limit repository 105 to various applications. The interfaces 130-138 allow the applications to be independently modified without requiring changes to the limit repository 105 or other applications. In addition, the limit repository 105 can be modified without requiring changes to the applications. In this example, each interface 130-138 corresponds to the same set of interfaces used by a different application, although this need not be the case.

In concert with the applications, the limit repository 105 can monitor and maintain consistency between the applications. For example, if a limit used by the planner application 112 is modified such that it becomes inconsistent with the limit repository 105 or any other application, the limit repository 105 can inform the application 112 of the inconsistency. Also, the limit repository 105 can inform the application 112 how the limit is inconsistent and what changes or actions can be completed to re-establish consistency. In response, the application can execute the necessary changes or actions to re-establish consistency. In addition, the limit repository 105 can report to engineering or management when an inconsistency is not resolved as well as identify the responsible entities. Therefore, the system 100 is able to continue operations without inconsistent or conflicting limits causing inefficient operation, costly plant incidents, and process shutdowns.

In some embodiments, the limit repository 105 uses rules to identify inconsistent limits and to determine suitable courses of action. The limit repository 105 can also support multiple limit types and various consistency rules for each type. As a particular example, the limit repository 105 can include three types of limits, namely boundaries, constraints, and operating limits. Further details regarding these types of limits are discussed below.

Figure 2:
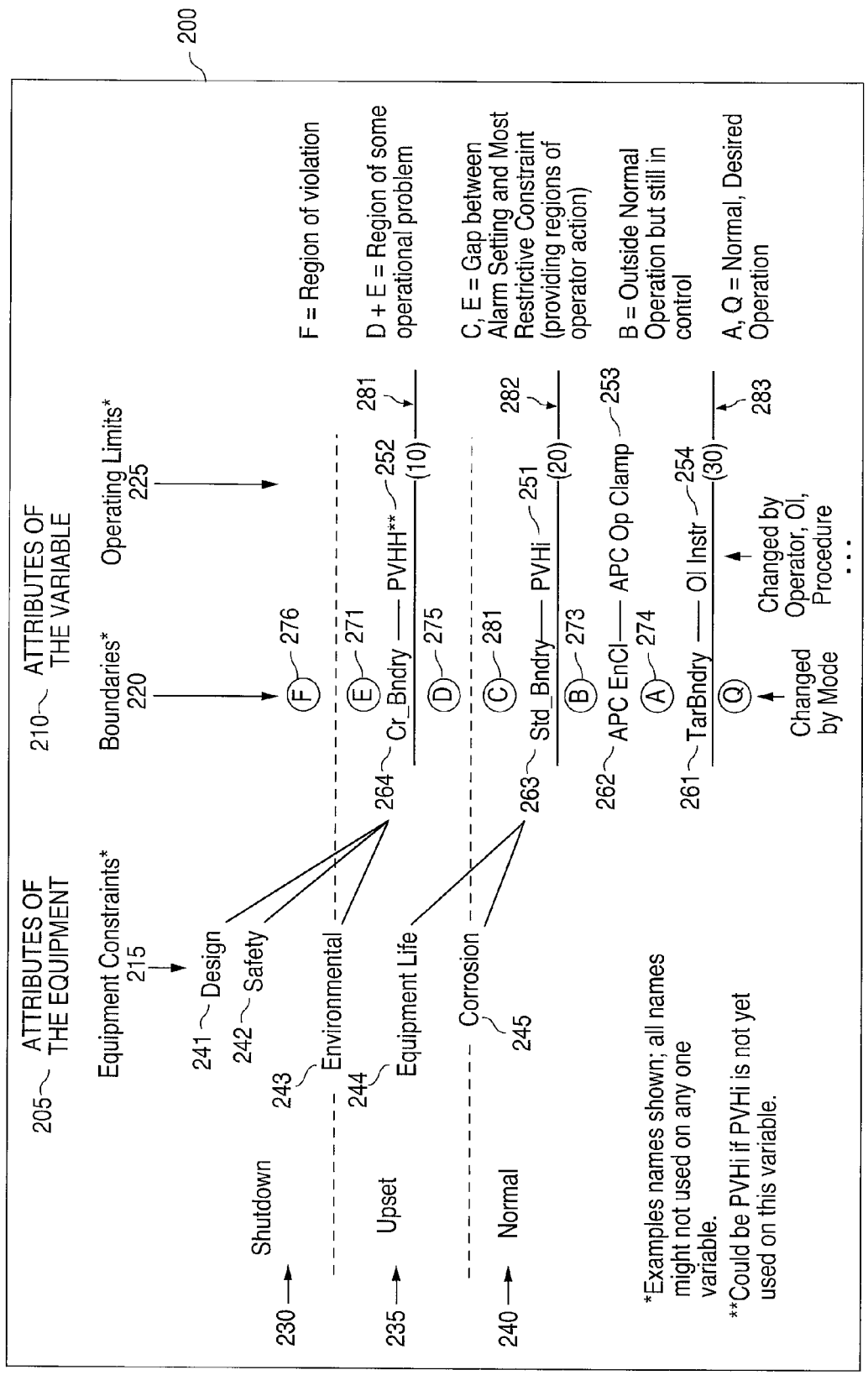
FIG. 2 illustrates an example of limit types and their relationships according to this disclosure.

FIG. 2 illustrates an example of limit types and their relationships according to this disclosure. The limit types and relationships shown in FIG. 2 are for illustration only. Other limit types and relationships could be used without departing from the scope of this disclosure.

As shown in FIG. 2, a limit repository model (LRM) 200 is illustrated that can be used in the limit repository 105. In this example, the LRM 200 includes attributes of equipment 205 and attributes of variables 210, which are associated with three types of limits (equipment constraints 215, boundaries 220, and operating limits 225). Equipment constraints 215 are attributes of equipment 205, while operating limits 225 and operating boundaries 220 are attributes of variables 210 (i.e., a measurement). A variable may be associated with a specific piece of equipment, but the variable's boundaries and operating limits may be driven by constraints from multiple pieces of equipment (such as upstream and downstream equipment).

The LRM 200 includes three regions of operation in this example, namely a shutdown region 230, an upset region 235, and a normal region 240. However, the LRM 200 can include any number of levels referred to using any nomenclature or description. The regions generally denote an urgency of action, which can also be characterized as a criticality associated with the region.

Equipment constraints 215 are based on various concerns associated with equipment that operating boundaries are intended to correct, such as design constraints 241, safety constraints 242, environmental constraints 243, equipment life constraints 244, and corrosion control constraints 245. Applications 114 can provide the equipment constraints 215 that identify a specific concern to guard against. The applications 114 can also assign the equipment constraints 215 to the levels 281-283, either explicitly or via a related boundary 220. When an equipment constraint 215 is assigned to a boundary 220, the equipment constraint 215 level assignment will change when the boundary level changes. Equipment constraints 215 can also be associated to variables by the boundary owner or by the constraint owner for checking consistency of the various limits on that variable.

Operating limits 225 are the limits that have an effect on operation. Some examples of operating limits are alarm limits like process variable high (PVHI) 251 and process variable high-high (PVHH) 252 alarms, APC operating clamps 253, and weekly or daily operating targets 254 that may be limits or a specific focus values.

Operating limits are assigned to levels indirectly by assignment to boundaries, which bind them. For example, the control room engineer, or the alarm rationalization team, may use the ACM applications 122 to configure a reference to a DCS limit and assign the boundary.

Operating boundaries (or "boundaries") 220 are assigned to numbered levels 281-283, which are designed to protect regions of operation 230-240, such as by their owning application when the boundary type is registered. Example numbered levels include "10" 281, "20" 282 and "30" 283. Boundaries 220 are the bounds for the various operating limits, which are designed to protect potential problems identified by equipment constraints 215 associated with variables. Examples of boundaries 220 are target boundaries 261, APC boundaries 262, and alarm boundaries (like standard boundary 263 and critical boundary 264). The boundary type to level assignment could be changed at the system level by the owning application. Further, multiple boundaries 220 can be assigned to the same level. In addition, independent applications can set their own boundaries 220 to the same or different levels. For example, the target boundary 261 and the APC boundary 262 could be assigned to level "30" 283 inside the standard boundary 263 (to which alarms are attached), and the standard boundary 263 can be assigned to protect the upset region 235 of operation while the critical boundary 264 can be assigned to level "10" 281 to protect the shutdown region 230 of operation. Boundaries 220 generally set the bounds for the operating limits 225.

Alarm boundaries, such as the standard boundary 263 and the critical boundary 264, can represent engineered settings for the alarm limits as entered by an alarm rationalization team. Control Engineers may or may not (depending on operating philosophy) be able to adjust the actual alarm limits in the DCS. The alarm rationalization team, using the ACM applications 122, can design these rationalized settings to provide an appropriate "gap" between the alarm boundary and the concern or concerns the alarm limit is protecting (as identified by one or more associated equipment constraints 215). For example, the control engineer can set the critical boundary 264 such that gap "E" 271 is created between the critical boundary 264 at level "10" 281, which is protecting the shutdown region 230. The control engineer can also set the standard boundary 263 such that gap "C" 272 is created between the standard boundary 263 protecting the upset region 235.

The APC boundary 262 can be determined by an APC engineer using the APC applications 124 and defines the region within which the APC operating clamps 253 can be placed by the operator. The APC boundary 262 could be set within the alarm boundaries 263-264 with an appropriate gap "B" 273 between the APC boundary 262 and the alarm boundaries 263-264.

A planner or engineer can set the target boundaries 261. The target boundaries 261 provide the outer bounds for the planning limits for specific operating plans. The target boundary 261 can also be set appropriately within the alarm boundaries 263-264. The target boundary 261 can be set at or within the APC boundary 262, possibly with an appropriate gap "A" 274+"B" 273 between the target boundary 261 and the alarm boundaries 263-264.

These alarm limits, boundaries, and gaps provide a protection to avoid regions of abnormal operation. For example, operating in gap "D" 275 can result in a shortening of the equipment life or increased corrosion to the equipment. In addition, gap "F" 276 is a region of violation that exists when operating in the shutdown region 230. Operation in this region of violation can result in safety or environmental violations as well as result in a shortening of the equipment life or increased corrosion to the equipment.

Operating boundaries 220 may have differing values, such as based on differing plant operating modes. Limit values from different operating modes may or may not affect all boundaries on a variable. For example, if the alarm settings are different for winter versus summer operation, the APC boundaries 262 and the target boundaries 261 can follow suit. Moreover, equipment constraints 215 can be associated to variables, such as by the boundary owner or by the constraint owner. For example, design constraints 241, safety constraints 242, and environmental constraints 243 can be assigned to the critical boundary 264, and equipment life constraints 244 and corrosion control constraints 245 can be assigned to the standard boundary 263. In addition, one or more operating limits 225 can be assigned to a boundary 220. In this example, PVHI 251 is assigned to the standard boundary 263, while PVHH 252 is assigned to the critical boundary 264. Consistency rules can define how the boundaries 220, constraints 215, and operating limit 225 interrelate.

Operating boundaries 220 can be assigned level numbers 281-283 or other indicators that identify the "level of urgency" for the particular operating problem being protected. For example, lower numbers could represent outer levels with higher levels of urgency. For a given variable, boundaries 220 at the same level may not constrain each other, but boundaries at inner levels (higher numbers) can be inside of or equal to the innermost value of boundaries at outer levels.

Constraints 215 might not constrain each other. However, by identification of a boundary 220, constraints 215 can be assigned a level of urgency when they are created. In addition, for checking consistency of limits on a variable, constraints 215 can be associated with the variable or variables that they affect. To be consistent, an operating boundary (of a variable) 220 can be at or within all associated equipment constraints 215 at its level or outer levels. This helps to support engineering or design consistency.

To be consistent, operating limits 225 can be inside of or at their assigned boundaries 220. This helps to support operating consistency. Specifics of this consistency and enforcement can be determined by the specific application that owns the limits. For example, various ACM applications 122 can have enforcement options and functions that allow inconsistencies to persist temporarily (such as operator override) or semi-permanently (such as suspension of enforcement for a variable). The limit repository 105 can use the relationships between constraints 215, boundaries 220, and limits 225 in the IRM 200 to decouple the operating limit settings from concerns identified by the equipment constraints that the operating limit settings are protecting. Therefore, the limit repository 105 is configured to simplify the relationships while preserving traceability to the relevant underlying problems.

In some conventional systems, consistency rules between applications would be bound too tightly. As a result, modification of one application often required modification of the other applications, or inconsistencies would develop and cause process problems. The limit repository 105 is configured to identify inconsistencies, inform one or more applications regarding the inconsistency and optionally provide a corresponding corrective action. Accordingly, the limit repository 105 is configured to maintain operation despite an inconsistency created when an application is modified.

The limit repository 105 therefore enables the applications, such as applications 112-114 and 122-126, to be independently designed and configured. In particular embodiments, boundary names can be supplied by the user, while operating limit names can be defined by the control system or application. For example, alarm limits from various DCSs often have differing names. Even within the same DCS, a given alarm (such as a PVHI 251 alarm) could be assigned to differing boundaries 220 according to the appropriate level of urgency for that alarm. Independent boundary names supplied by the user could have various advantages:

When other applications check for consistency, the other applications can check against the boundary names independent of specific DOS names and independent of the specific alarm configured. The boundary names can be tied to the level of urgency, which is more relevant to other applications than specific DOS alarm limit names.

Alarm rationalization teams can determine that a specific alarm is redundant or not necessary such that the alarm limit could be removed. However, other applications can still respect where the alarm would be. The limit repository 105 is configured to preserve the boundary while removing an alarm's association to it.

Therefore, the use of boundary names in the LRM 200 provides a DOS-independent and alarm rationalization-independent method of enabling applications to access relevant alarm information. The LRM 200 may enable multiple boundaries 220 to be assigned to a given level. This allows applications to contribute boundaries 220 and limits 225 independently from other applications.

As a particular example, an alarm designer may decide that PVHH 252 and PVHI 251 alarms are both protecting the same thing but that the PVHI 251 alarm provides the operator with a larger time gap (i.e. an early warning). As another example, two applications may wish for their boundaries 220 to respect alarm limit settings (alarm boundaries 263-264), but these two applications are able to make different assumptions regarding how much gap should be provided between their boundaries and the alarms, and the applications need not restrict each other's boundaries. As yet another example, a boundary name can be supplied at each level 281-283 strictly for an equipment constraint 215 entry, if desired, to keep the equipment constraint data entry independent of any future added application boundary names. If a zero gap is used, this equipment constraint 215 becomes a boundary 220 that embodies the most restrictive constraint (MRC) for the other boundaries 220 at this level.

Furthermore, the limit repository 105 can be configured such that data in the limit repository 105 is accessed via the standardized (and clearly documented) interfaces 130-138, which can remain supported in future releases. As a result, the limit repository 105 decouples the applications that contribute limits from release dependence on each other or on the limit repository 105. In addition, new functions may be added to future releases of the limit repository 105 that future application versions can take advantage of, but the new functions can be manifested by interface additions without changing existing interfaces and functions.

In addition, ownership of the limits (that is, the master copy) can remain with the application that contributes the limits. The limit repository 105 need not require applications to change their limits, even due to inconsistencies. Rather, the limit repository 105 could identify and assess inconsistencies, and this assessment can be made available to contributing applications and for reporting. However, applications are not required to change their rules for creating these values. For example, an equipment specialist may insist that an environmental constraint 243 should be changed, while a planner's and an alarm designer's applications may note and react to the inconsistency.

In some embodiments, the limit repository 105 can be divided into multiple instances, which can be distributed over multiple network domains (such as the domains 110-120). Limit values can be copied amongst the multiple instances as needed, allowing applications in each domain to contribute limits and to view each other's limits. Application ownership of limits can extend to the domain in which the owning application posts or references the limit.

In particular embodiments, the limit repository 105 includes equipment (asset) models that are used to identify constraints and to hold boundary mode values when they drive application limit changes. The equipment models can also be used to support client browsing of the limit repository's data. The limit repository 105 can use the asset models necessary to support the contributing applications' limits, but the limit repository 105 need not provide its own asset model.

Use of the limit repository 105 can help to achieve and maintain consistency among limits utilized by various applications and application concerns. The limit repository 105 can increase the awareness of an operating team with regard to the current state of the operating plant, such as by identifying where the process is closest to its limits or problems of certain kinds. It can also help by identifying potential missed opportunities, such as when the difference between the current operating point and a boundary represents lost benefits. The limit repository 105 can provide a single place for applications to access for this information.

The limit repository 105 can support various types of planning and other applications. Applications can be pro-active and present for their clients the contextual Limit Repository information for planners and engineers. This can provide the basis for efficient "right the first time" approaches to these activities. This includes evaluating limit contexts for operating modes other than the current mode.

The limit repository 105 can further provide a single point to access an information base for monitoring and reporting on success and failure of operating within limits. For business reasons and for regulatory agencies, it is often important to monitor and report against equipment constraints that are behind alarms, rather than (or as well as) the control room alarms themselves.

Figure 3:
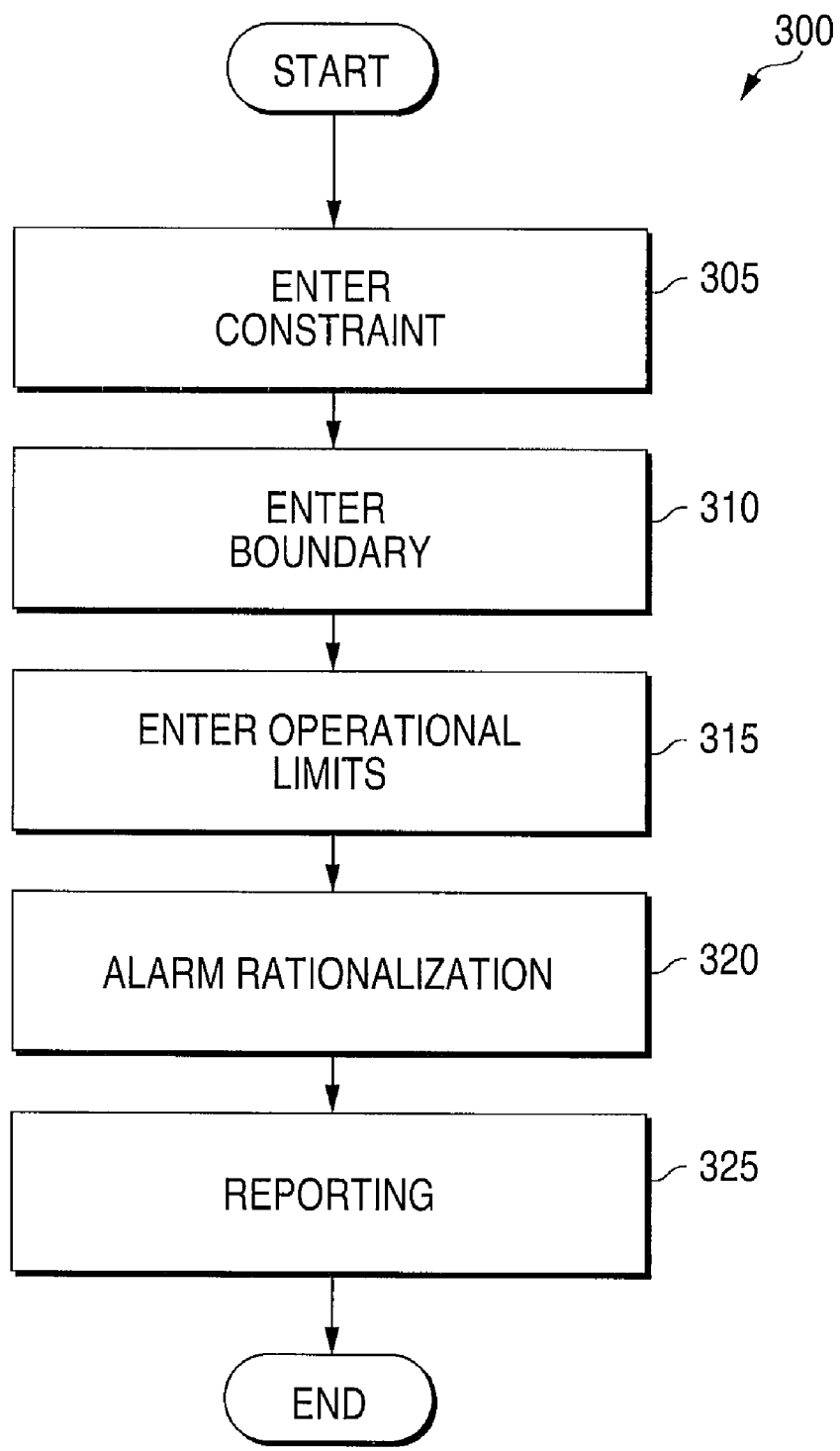
FIG. 3 illustrates an example method for supporting a limit process according to this disclosure.

FIG. 3 illustrates an example method 300 for supporting a limit process according to this disclosure. The embodiment of the method 300 shown in FIG. 3 is for illustration only. Other embodiments of the method 300 could be used without departing from the scope of this disclosure.

In this example, an equipment specialist enters a constraint in block 305. The constraint can be based on a design concern, safety concern, environmental concern, equipment life concern, corrosion concern, or other concern. The equipment specialist can also assign the constraint to a level corresponding to the level of urgency for the concern. The level of urgency can be determined by local policy, regulatory requirement, or other criteria. In some embodiments, the equipment specialist assigns the constraint to a boundary.

In block 310, a control engineer enters one or more boundary values for each variable. The boundaries can include a target boundary, an APC boundary, and alarm boundaries. The alarm boundaries can include a standard boundary and a critical boundary. The boundaries can be set with appropriate gaps disposed between a boundary and a concern from which the boundary is established to protect. In some cases, the gaps define regions above which operation can cause damage.

In block 315, the control engineer enters one or more operating limits. The operating limits can include alarms (such as PVHH and PVHI alarms) or settings such as an APC operating clamp or operating instruction setting. The operating limits can be assigned to corresponding boundaries or levels. The operating limits can effect operation of the system. Depending upon the site or operating philosophy, the operating limits may be adjusted after initial entry.

In block 320, the control engineer performs alarm rationalization to identify alarm redundancies or if certain alarms are not necessary. The control engineer may use the limit repository to remove an unnecessary alarm limit while preserving the boundary such that other applications can respect boundary regardless of the presence or absence of an alarm limit for that boundary.

In block 325, the limit repository provides a single source repository reporting mechanism. Data in the limit repository can be accessed via clearly documented interfaces. The limit repository can identify the most restrictive constraint associated with the operating boundaries at a given level such that the association between an operating limit and the problem that it protects is clear, including the operating gap between the operating limit and the problem within which the operator and the control system can act to avoid the problem. The LRM also separates the evaluation of limit consistency and reporting thereof from the applications that own the limits. Applications remain loosely coupled in that they may observe the consistency rules or may not, while the limit repository identifies inconsistencies so that they may be resolved.

Figure 4:
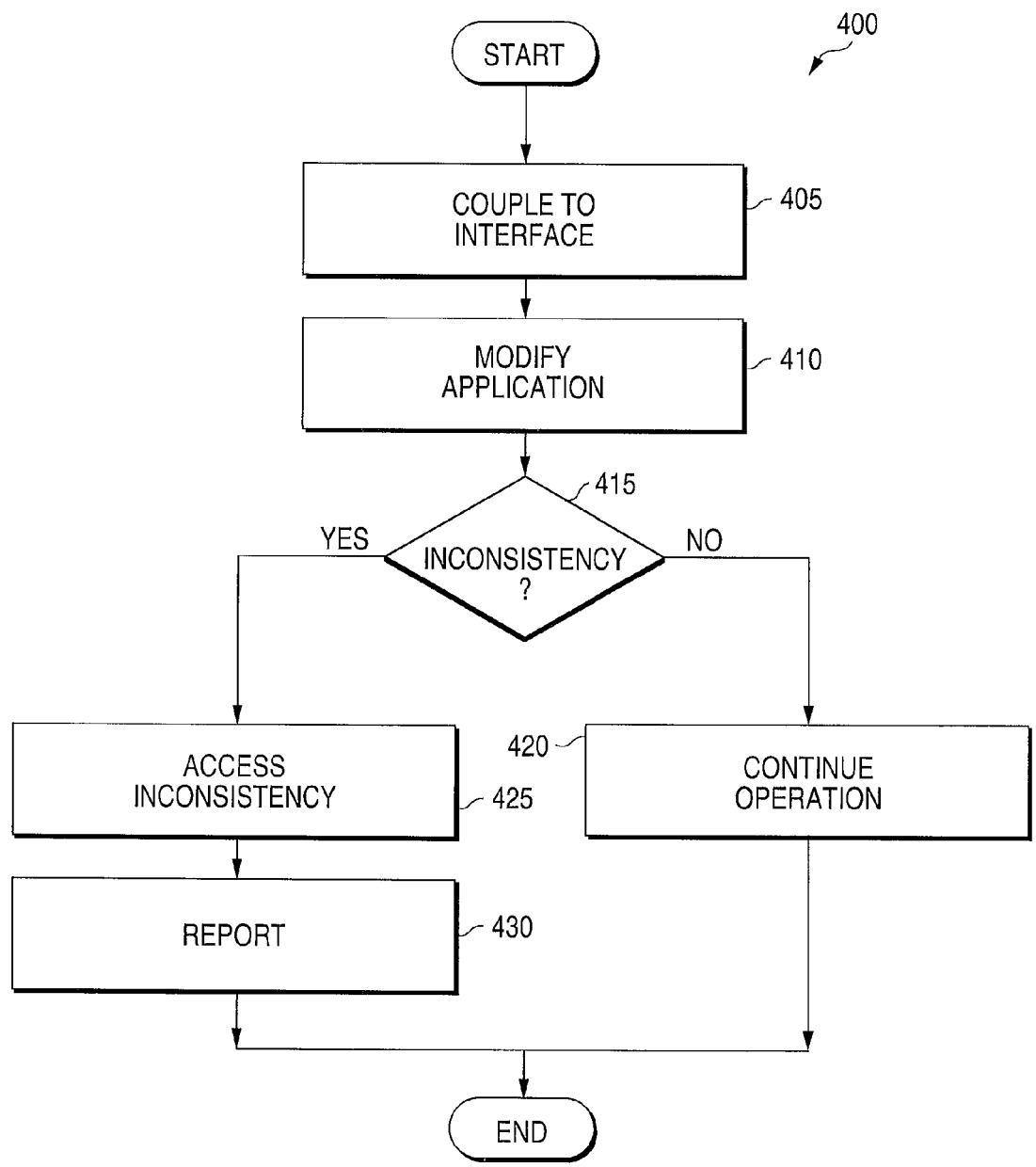
FIG. 4 illustrates an example method for maintaining a limit repository according to this disclosure.

FIG. 4 illustrates an example method 400 for maintaining a limit repository according to this disclosure. The embodiment of the method 400 shown in FIG. 4 is for illustration only. Other embodiments of the method 400 could be used without departing from the scope of this disclosure.

As shown in FIG. 4, an application is coupled to the limit repository via a defined interface in block 405. For example, a new planner application can be installed to replace a previous planner application. The new application can communicate data to and from the limit repository 105 via one or more of the interfaces 130-138.

In block 410, one of the applications is modified. For example, the APC application can be modified such as via a software upgrade, incorporation of new equipment, or adjustments to its operation. Alternatively, the limit repository may be modified to incorporate new or improved functions and features.

The limit repository checks for inconsistency in block 415. The inconsistency may be caused by modifications to one or more of the applications or to the limit repository itself. If no inconsistencies are identified, the system continues normal operation in block 420. If the limit repository identifies an inconsistency, the limit repository assesses the inconsistency in block 425, and the limit repository makes this assessment available in block 430. This assessment is available to contributing applications and for reports, but ownership of the limit(s) involved in the inconsistency can remain with the application(s) associated with the limits.

Although the figures above illustrate specific systems, structures, and methods, various changes may be made to the figures. For example, various components in the systems and structures can be combined, omitted, further subdivided, or moved according to particular needs. Also, while shown as a series of steps, various steps in FIG. 3 and FIG. 4 could overlap, occur in parallel, or occur multiple times. Further, while various applications have been described as providing limit values to the limit repository 105, the applications could make their limits available via references to exploit the limit repository's capabilities without direct changes to the applications. In addition, while certain personnel are described above as performing certain functions, the limit repository 105 could be associated with any suitable applications used by any suitable users.

In some embodiments, various functions described above are implemented or supported by a computer program that is formed from computer readable program code and that is embodied in a computer readable medium. The phrase "computer readable program code" includes any type of computer code, including source code, object code, executable code, and interpreted code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one memory configured to store application information associated with multiple process control applications used to control an industrial process, the application information comprising multiple boundaries associated with the process control applications, each boundary set and associated with at least one of multiple hierarchical levels;
   at least one processing device configured to alter the association of the boundaries with the hierarchical levels independent of the process control applications, the hierarchical levels associated with different levels of criticality regarding the industrial process; and
   at least one interface configured to receive data from and transmit data to the process control applications.

2. The apparatus of claim 1, wherein:
   the application information further comprises operating limits defined by the process control applications and associated with the industrial process; and
   the at least one processing device is further configured to identify an inconsistency between at least two of the applications based on the operating limits.

3. The apparatus of claim 2, wherein the at least one processing device is further configured to report the identified inconsistency.

4. The apparatus of claim 1, wherein at least two of the boundaries are associated with a single one of the hierarchical levels.

5. The apparatus of claim 1, wherein:
   the application information further comprises equipment constraints associated with the industrial process, each equipment constraint associated with one of the hierarchical levels; and
   at least one equipment constraint in one hierarchical level overlaps with at least one equipment constraint in an adjacent hierarchical level.

6. The apparatus of claim 5, wherein the at least one processing device is further configured to identify a most restrictive equipment constraint associated with one of the boundaries at a specified hierarchical level.

7. The apparatus of claim 1, wherein the at least one processing device is configured to identify a redundant operating limit associated with one of the applications.

8. The apparatus of claim 1, wherein the at least one processing device is configured to create multiple instances of a repository comprising the application information.

9. A method comprising:
   receiving, by at least one memory, application information associated with multiple process control applications used to control an industrial process, the application information comprising multiple boundaries associated with the process control applications, each boundary set and associated with at least one of multiple hierarchical levels; and
   altering, by at least one processing device, the association of the boundaries with the hierarchical levels independent of the process control applications, the hierarchical levels associated with different levels of criticality regarding the industrial process.

10. The method of claim 9, wherein:
    the application information further comprises operating limits defined by the process control applications and associated with the industrial process; and
    the method further comprises identifying an inconsistency between at least two of the applications based on the operating limits.

11. The method of claim 10, wherein the method further comprises:
    reporting the identified inconsistency.

12. The method of claim 9, wherein at least two of the boundaries are associated with a single one of the hierarchical levels.

13. The method of claim 9, wherein:
    the application information further comprises equipment constraints associated with the industrial process, each equipment constraint associated with one of the hierarchical levels; and
    at least one equipment constraint in one hierarchical level overlaps with at least one equipment constraint in an adjacent hierarchical level.

14. The method of claim 13, wherein the method further comprises:
    identifying a most restrictive equipment constraint associated with one of the boundaries at a specified hierarchical level.

15. The method of claim 9, wherein the method further comprises:
    identifying a redundant operating limit associated with one of the applications.

16. A non-transitory computer readable medium embodying a computer program, the computer program comprising computer readable program code for:
    receiving application information associated with multiple process control applications used to control an industrial process, the application information comprising multiple boundaries associated with the process control applications, each boundary set and associated with at least one of multiple hierarchical levels; and
    altering the association of the boundaries with the hierarchical levels independent of the process control applications, the hierarchical levels associated with different levels of criticality regarding the industrial process.

17. The computer readable medium of claim 16, wherein:
    the application information further comprises operating limits defined by the process control applications and associated with the industrial process; and
    the computer program further comprises computer readable program code for identifying an inconsistency between at least two of the applications based on the operating limits.

18. The computer readable medium of claim 16, wherein:
    the application information further comprises equipment constraints associated with the industrial process, each equipment constraint associated with one of the hierarchical levels; and
    at least one equipment constraint in one hierarchical level overlaps with at least one equipment constraint in an adjacent hierarchical level.

19. The computer readable medium of claim 18, wherein the computer program further comprises computer readable program code for identifying a most restrictive equipment constraint associated with one of the boundaries at a specified hierarchical level.

20. The computer readable medium of claim 16, wherein the computer program further comprises computer readable program code for:
    identifying a redundant operating limit associated with one of the applications.

21. The apparatus of claim 1, wherein the multiple boundaries comprise one or more of: an operating boundary; an alarm boundary; a standard boundary; a critical boundary; a target boundary; and an advanced process control boundary.

* * * * *